(12) United States Patent
Uhm (10) Patent No.: US 11,209,161 B2
(45) Date of Patent: Dec. 28, 2021

(54) COMBUSTOR, GAS TURBINE INCLUDING THE SAME AND METHOD OF DISTRIBUTING COMPRESSED AIR IN COMBUSTOR

(71) Applicant: Doosan Heavy Industries & Construction Co., LTD, Changwon-si (KR)

(72) Inventor: Jongho Uhm, Yongin-si (KR)

(73) Assignee: Doosan Heavy Industries & Construction Co. LTD, Changwon-si (KR)

( * ) Notice: Subject to any disclaimer, the term of this patent is extended or adjusted under 35 U.S.C. 154(b) by 119 days.

(21) Appl. No.: 15/947,707

(22) Filed: Apr. 6, 2018

(65) Prior Publication Data
US 2018/0320898 A1 Nov. 8, 2018

(30) Foreign Application Priority Data
May 8, 2017 (KR) .......................... 10-2017-0057558

(51) Int. Cl.
*F23R 3/00* (2006.01)
*F01D 9/02* (2006.01)
*F02C 7/18* (2006.01)

(52) U.S. Cl.
CPC .............. *F23R 3/002* (2013.01); *F01D 9/023* (2013.01); *F02C 7/18* (2013.01); *F05D 2260/201* (2013.01); *F23R 2900/03044* (2013.01)

(58) Field of Classification Search
CPC ...................... F01D 9/023; F23R 3/002; F23R 2900/03044; F02C 7/18
See application file for complete search history.

(56) References Cited

U.S. PATENT DOCUMENTS

2002/0078691 A1  6/2002  Hoeker
2011/0107766 A1*  5/2011  Davis, Jr. ............... F23R 3/005
60/755
(Continued)

FOREIGN PATENT DOCUMENTS

CN  102062399 A  5/2011
EP  18168368.1  9/2018
(Continued)

OTHER PUBLICATIONS

Korean Office Action.

*Primary Examiner* — Katheryn A Malatek
(74) *Attorney, Agent, or Firm* — Foundation Law Group LLP; Kwang Jun Kim; JD Harriman (57) ABSTRACT

Disclosed herein is a combustor capable of improving impingement cooling performance by reducing the influence of a cross-flow on a jet flow. The combustor includes a combustion liner, in which fuel sprayed from fuel nozzles of a gas turbine is mixed with compressed air and the mixture is combusted, a sleeve surrounding the outer surface of the combustion liner while being spaced apart therefrom in order to form a flow passage for compressed air, a cooling hole formed in the sleeve to introduce compressed air discharged from a compressor into the flow passage, and a first auxiliary hole formed upstream of the cooling hole in the airflow direction. Compressed air discharged from the compressor is introduced into the flow passage through the first auxiliary hole, impinges with compressed air flowing through the flow passage, and forms an air column.

9 Claims, 7 Drawing Sheets

(56) References Cited

U.S. PATENT DOCUMENTS

| | | |
|---|---|---|
| 2011/0232299 A1 | 9/2011 | Stryapunin et al. |
| 2012/0234012 A1* | 9/2012 | Brown .................... F01D 9/023 60/752 |
| 2012/0304659 A1 | 12/2012 | Berkebile et al. |

FOREIGN PATENT DOCUMENTS

| JP | 2010043643 A | 2/2010 |
|---|---|---|
| JP | 5224742 B | 7/2013 |
| KR | 10-19780000164 B | 8/1982 |
| KR | 10-1355373 B | 7/2013 |
| KR | 10-1621634 B | 7/2017 |

* cited by examiner

FIG. 10C

COMBUSTOR, GAS TURBINE INCLUDING THE SAME AND METHOD OF DISTRIBUTING COMPRESSED AIR IN COMBUSTOR

CROSS-REFERENCE TO RELATED APPLICATION

This application claims priority to and the benefit of Korean Patent Application No. 10-2017-0057558 filed in the Korean Intellectual Property Office on May 8, 2017, the entire contents of which are incorporated herein by reference.

BACKGROUND

Field

The system relates to a combustor, a gas turbine including the same, and a method of distributing compressed air in the combustor.

Description of the Related Art

A turbine is a mechanical device that extracts an impulsive/or repulsive force from the flow of a compressive fluid or uses compressed air and fuel to produce heat release energy with huge fluid momentum by burning fuel and air mixture in combustion chamber and converts the same into a rotational force. If steam is used as the fluid, it is called a steam turbine, and if combustion gas is used as the fluid, it is called a gas turbine.

The thermal cycle of the gas turbine is referred to as the Brayton cycle, and the gas turbine comprises a compressor, a combustor, and a turbine. According to the operating principle of the gas turbine, air is sucked from the atmosphere and compressed by the compressor, the compressed air is supplied to the combustor wherein air and fuel are mixed and burnt to produce high-temperature and high-pressure combustion gas for driving the turbine, and exhaust gas is emitted to the atmosphere. As such, the thermal cycle of the gas turbine includes four processes, namely compression, combustion, expansion, and heat rejection.

The compressor of the gas turbine serves to suck air from the atmosphere and to supply the air for combustion to the combustor. The pressure and the air temperature in the compressor are increased via adiabatic compression.

The combustor mixes the compressed air introduced thereinto with fuel and combusts the mixture to produce combustion gas having high energy. Through an isobaric combustion process, the temperature of the combustion gas is raised up to the temperature limit of the combustor and the turbine.

The high-temperature and high pressure combustion gas produced from the combustor is expanded in the turbine, and the expanded gas provides an impulsive or repulsive force to the rotary blades of the turbine, thus generating mechanical energy. Some of the mechanical energy generated in the turbine is supplied to the compressor as energy for compressing air, and the remainder is used to drive an electric generator in order to produce power.

It is important in terms of improvement of durability of the combustor to cool a combustor liner and a transition piece, which are exposed to high temperature and high-pressure combustion gas. The combustor liner and the transition piece are surrounded by a flow sleeve. Air is introduced through a cooling hole formed in the flow sleeve and impinges with the surfaces of the combustor liner and the transition piece in the direction perpendicular thereto, thereby cooling the combustor liner and the transition piece.

However, a jet flow introduced through the cooling hole applies impingement cooling to the surfaces of the combustor liner and the transition piece in the diagonal direction, not in the direction perpendicular thereto, due to a cross-flow, which flows through a flow passage, defined by the combustor liner, the transition piece and the flow sleeve surrounding the combustor liner and the transition piece, in the transverse direction. In addition, the angle at which the impingement cooling is implemented in the diagonal direction is gradually increased toward the upstream side in the airflow direction by airflow momentum, which is gradually increased toward the upstream side, Therefore, impingement cooling efficiency is low, and the temperature of the outer surfaces of the combustor liner and the transition piece becomes high, and consequently the strength of the combustor liner and the transition piece is deteriorated. As a result, the lifespan of the combustor liner and the transition piece is shortened, and thus these components need to be frequently replaced.

RELATED ART DOCUMENT

Patent Document

Korean Patent Registration No. 10-0013120 entitled "COMBUSTION APPARATUS FOR A GAS TURBINE ENGINE"

SUMMARY

Therefore, the system has been made m view of the above problems, and it is an object of the system to provide a combustor capable of improving impingement cooling performance by reducing the influence of a cross-flow on a jet flow, a gas turbine including the same, and a method of distributing compressed air in the combustor.

In accordance with an aspect of the system, the above and other objects can be accomplished by the provision of a combustor including a combustion liner constituting a combustion chamber and disposed on the upstream side in the combustion gas flow direction, a transition piece constituting the combustion chamber and disposed on the downstream side in the combustion gas flow direction, and a sleeve surrounding the combustion liner and the transition piece while being spaced apart therefrom. A flow passage is formed between the combustion liner and the sleeve and between the transition piece and the sleeve, and compressed air discharged from a compressor is introduced into the flow passage through a cooling hole formed in the sleeve. A first auxiliary hole is formed upstream of the cooling hole in the airflow direction. Compressed air discharged from the compressor is introduced into the flow passage through the first auxiliary hole, impinges with compressed air flowing through the flow passage, and forms an air column.

When the cooling hole has a diameter of a value of D, the first auxiliary hole may be formed to have a diameter of a value of 0.5 D or less.

The cooling hole and the first auxiliary hole may be spaced apart from each other such that the straight-line distance therebetween has a value that is equal to or less than the diameter (D) of the cooling hole.

The combustor may further include a second auxiliary hole formed downstream of the cooling hole in the airflow direction. Compressed air discharged from the compressor may be introduced into the flow passage through the second auxiliary hole, may mitigate turbulence generated downstream of the cooling hole, and may maintain the momentum of the compressed air introduced through the cooling hole.

When the cooling hole has a diameter of a value of D, the second auxiliary hole may be formed to have a diameter of a value of approximately 0.5 D or less.

The cooling hole and the second auxiliary hole may be spaced apart from each other such that the straight-line distance therebetween has a value that is equal to or less than the diameter (D) of the cooling hole.

At least one of the first auxiliary hole or the second auxiliary hole may be formed such that at least a portion thereof overlaps the cooling hole.

In accordance with another aspect of the system, there is provided a combustor including a combustion liner constituting a combustion chamber and disposed on the upstream side in the combustion gas flow direction, and a transition piece constituting the combustion chamber and disposed on the downstream side in the combustion gas flow direction. A flow passage is formed between the combustion liner and a sleeve and between the transition piece and the sleeve, and compressed air discharged from a compressor is introduced into the flow passage through a cooling hole formed in the sleeve. A second auxiliary hole is formed downstream of the cooling hole in the airflow direction. Compressed air discharged from the compressor is introduced into the flow passage through the second auxiliary hole, mitigates turbulence generated downstream of the cooling hole, and maintains the momentum of the compressed air introduced through the cooling hole.

When the cooling hole has a diameter of a value of D, the second auxiliary hole may be formed to have a diameter of a value of 0.5 D or less.

The cooling hole and the second auxiliary hole may be spaced apart from each other such that the straight-line distance therebetween has a value that is equal to or less than the diameter (D) of the cooling hole.

The second auxiliary hole may be formed such that at least a portion thereof overlaps the cooling hole.

In accordance with a further aspect of the system, there is provided a gas turbine including a compressor configured to compress air, a combustor configured to receive compressed air from the compressor, to form a mixture by mixing the compressed air with fuel, and to combust the mixture, and a turbine configured to be rotated by combustion gas discharged from the combustor to produce power.

The combustor includes a combustion liner constituting a combustion chamber and disposed on the upstream side in the combustion gas flow direction, a transition piece constituting the combustion chamber and disposed on the downstream side in the combustion gas flow direction, and a sleeve surrounding the combustion liner and the transition piece while being spaced apart therefrom. A flow passage is formed between the combustion liner and the sleeve and between the transition piece and the sleeve, and compressed air discharged from the compressor is introduced into the flow passage through a cooling hole formed in the sleeve. A first auxiliary hole is formed upstream of the cooling hole in the airflow direction. Compressed air discharged from the compressor is introduced into the flow passage through the first auxiliary hole, impinges with compressed air flowing through the flow passage, and forms an air column.

The combustor may further include a second auxiliary hole formed downstream of the cooling hole in the airflow direction. Compressed air discharged from the compressor may be introduced into the flow passage through the second auxiliary hole, may mitigate turbulence generated downstream of the cooling hole, and may maintain the momentum of the compressed air introduced through the cooling hole.

In accordance with a further aspect of the system, there is provided a method of distributing compressed air in a combustor configured to receive compressed air from a compressor, to form a mixture by mixing the compressed air with fuel, and to combust the mixture, the method including forming a cross-flow by allowing compressed air to be introduced into a flow passage, formed between a combustion liner and a sleeve and between a transition piece and the sleeve, through a cooling hole and to flow through the flow passage, and forming an air column by allowing compressed air introduced into the flow passage through a first auxiliary hole, formed upstream of the cooling hole in the airflow direction, to impinge with the cross-flow.

The method may further include mitigating turbulence generated downstream of the cooling hole in the airflow direction and maintaining the momentum of the compressed air introduced through the cooling hole by allowing compressed air to be introduced into the flow passage through a second auxiliary hole formed downstream of the cooling hole in the airflow direction.

In accordance with a further aspect of the system, there is provided a method of distributing compressed air in a combustory the method including mitigating turbulence generated downstream of a cooling hole in the airflow direction and maintaining the momentum of the compressed air introduced through the cooling hole by allowing compressed air to be introduced into a flow passage through a second auxiliary hole, without forming an air column.

BRIEF DESCRIPTION OF THE DRAWINGS

The above and other objects, features and other advantages of the system will be more clearly understood from the following detailed description taken in conjunction with the accompanying drawings, in which.

DETAILED DESCRIPTION

Since embodiments of the system can be variously modified in many different forms, reference will now be made in detail to specific embodiments of the system. It is to be understood that the present description is not intended to limit the system to those specific embodiments and that the system is intended to cover not only the specific embodiments but also various alternatives, modifications, equivalents and other embodiments that may be included within the spirit and scope of the system as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Hereinafter, embodiments of the system will be described in detail with reference to the accompanying drawings. In the drawings, the same or similar elements are denoted by the same reference numerals even though they are depicted in different drawings. In the following description, a detailed description of known functions and configurations incorporated herein will be omitted when it may make the subject matter of the system rather unclear. In the drawings, elements may be exaggerated in size, omitted or schematically illustrated for convenience in description and clarity, FIG. 1 is a view illustrating the interior of a gas turbine according to an embodiment of the system, and FIG. 2 is a cross-sectional view of a combustor of the gas turbine according to an embodiment of the system.

Figure 1:
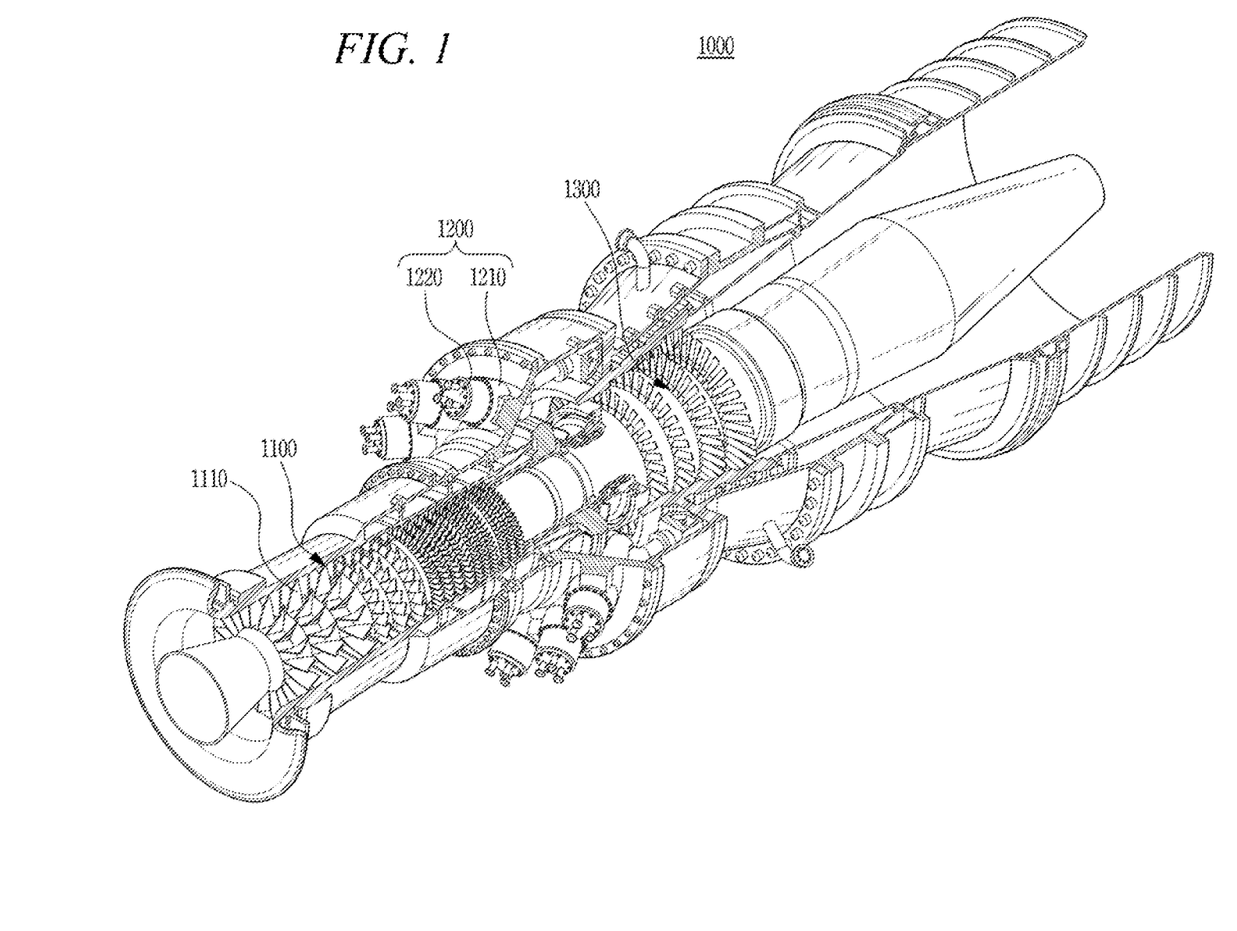
FIG. 1 is a view illustrating the interior of a gas turbine according to an embodiment of the system.
Figure 2:
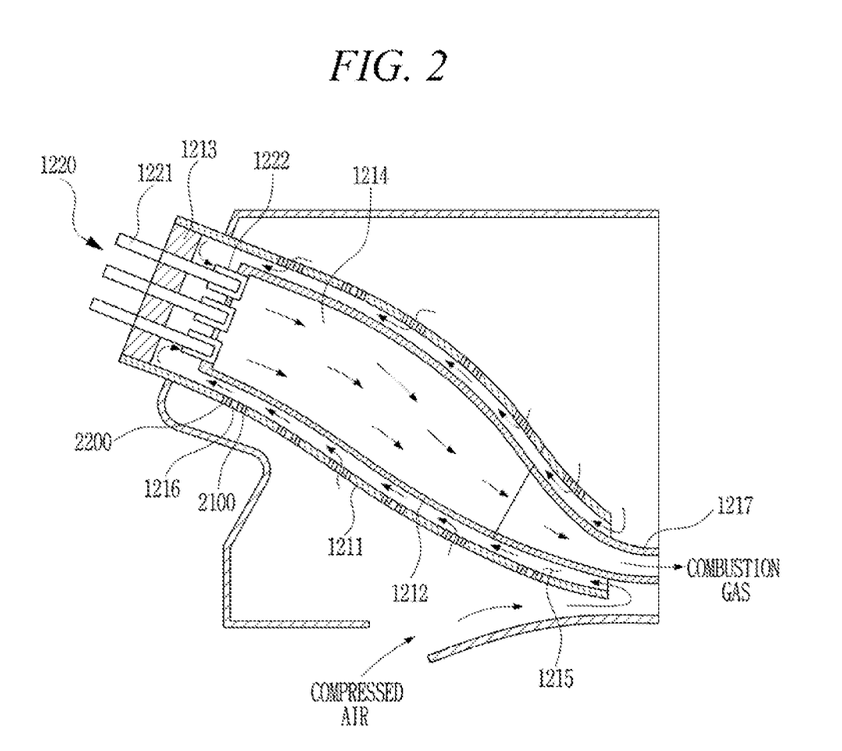
FIG. 2 is a cross-sectional view of a combustor of the gas turbine according to an embodiment of the system.

As illustrated in FIGS. 1 and 2 the gas turbine 1000 according to an embodiment of the system includes a compressor 1100, a combustor 1200, and a turbine 1300. The combustor 1200 includes a fuel nozzle assembly 1220, a combustion chamber 1210, a sleeve 1211, and an end plate 1213.

The combustion chamber 1210 is a space that is formed inside a combustion liner 1212 and a transition piece 1217. The sleeve 1211 surrounds the combustion liner 1212 and extends in one direction. The combustion liner 1212 is formed inside the sleeve 1211 so as to extend in the direction in which the sleeve 1211 extends. The combustion liner 1212 is disposed so as to be spaced a predetermined distance apart from the sleeve 1211, and a flow passage 1215 having a ring-shaped cross-section is formed between the sleeve 1211 and the combustion liner 1212. The end plate 1213 is coupled to an end portion of the sleeve 1211 so as to seal the sleeve 1211, The end plate 1213 may be coupled to a manifold, a related valve, and the like, which are provided for the supply of fuel to a fuel nozzle 1221.

The fuel nozzle assembly 1220 is connected to the combustion liner 1212. The fuel nozzle assembly 1220 includes a plurality of fuel nozzles.

Compressed air and fuel are mixed with each other in each of the fuel nozzles 1221. Each of the fuel nozzles 1221 is supported at one end thereof by the end plate 1213.

The air compressed in the compressor 1100 is introduced into the flow passage 1215 through a cooling hole 1216 formed in the sleeve 1211 and flows through the flow passage 1215 while cooling the combustion liner 1212. The compressed air, which has flowed through the flow passage 1215, reaches the end plate 1213 disposed at the end portion of the sleeve 1211. The direction in which the compressed air flows is changed by the end plate 1213, and the compressed air is introduced into the inlet port of the fuel nozzle assembly 1220. The compressed air introduced in this way is mixed with fuel, which is injected through the fuel nozzles 1221, and the mixture moves to the combustion chamber 1210, which is formed inside the combustion liner 1212 and the transition piece 1217. The mixture is ignited by an ignition plug (not illustrated) and is combusted in the combustion chamber 1210. Subsequently, the combusted gas is exhausted to the turbine 1300 and rotates the turbine 1300.

Figure 3:
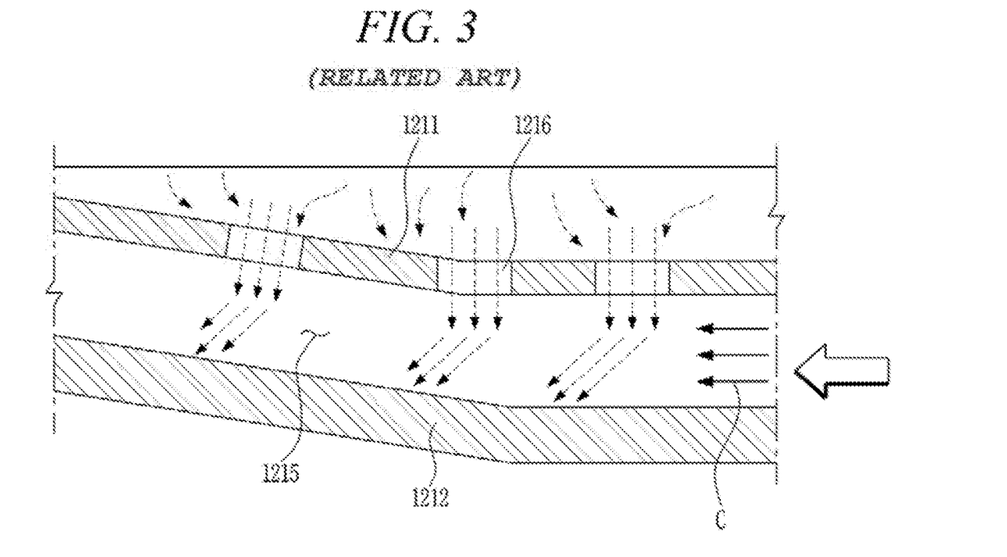
FIG. 3 is a view showing the influence of a cross-flow on a jet flow inside a flow passage.

Impingement cooling, which is applied to a combustion liner 1212 and a transition piece 1217 in a conventional combustor, will now be described with reference to FIG. 3. FIG. 3 is a view showing the influence of a cross-flow on a jet flow inside a flow passage.

As illustrated in FIG. 3, compressed air introduced into the flow passage 1215 through a cooling hole 1216 (hereinafter, referred to as a "jet flow") applies impingement cooling to the surfaces of the combustion liner 1212 and the transition piece 121 in the diagonal direction, not in the direction perpendicular thereto, due to compressed air flowing through the flow passage 1215 in the transverse direction (hereinafter, referred to as a "cross-flow"). In addition, the angle at which the impingement cooling is implemented in the diagonal direction is gradually increased toward the end portion of a sleeve 1211, at which an end plate 1213 is provided, by airflow momentum, which is gradually increased toward the end portion of the sleeve 1211.

Therefore, impingement cooling efficiency is low, and thus the temperature of the outer surfaces of the combustion liner 1212 and the transition piece 1217 becomes high. Consequently, the strength of the combustion liner 1212 and the transition piece 1217 is deteriorated.

Embodiments of the system provide a combustor that is capable of improving impingement cooling performance by reducing the influence of a cross-flow on a jet flow, as illustrated in FIG. 3.

Figure 4:
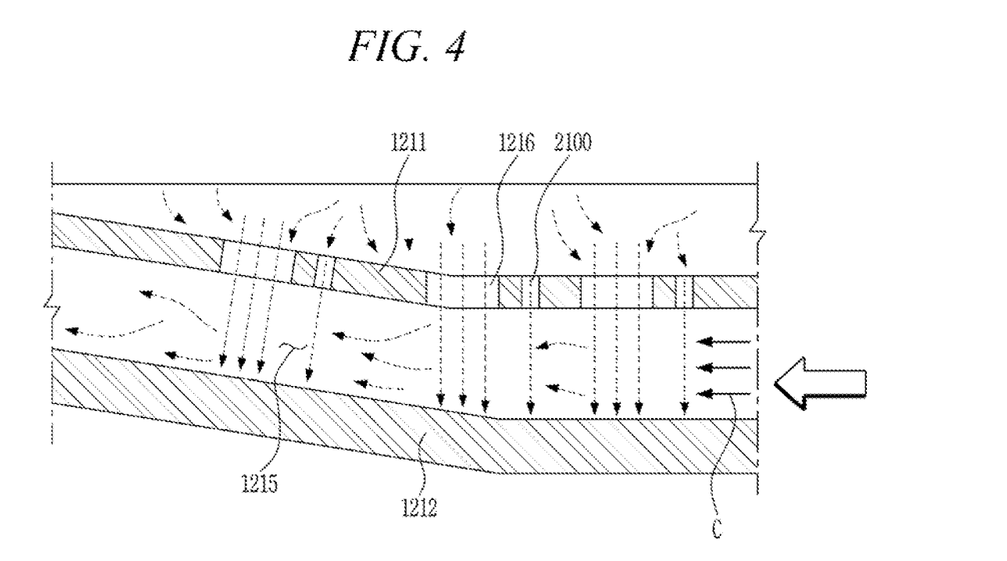
FIG. 4 is a partial side-sectional view illustrating a portion of a combustor according to an embodiment of the system.
Figure 5:
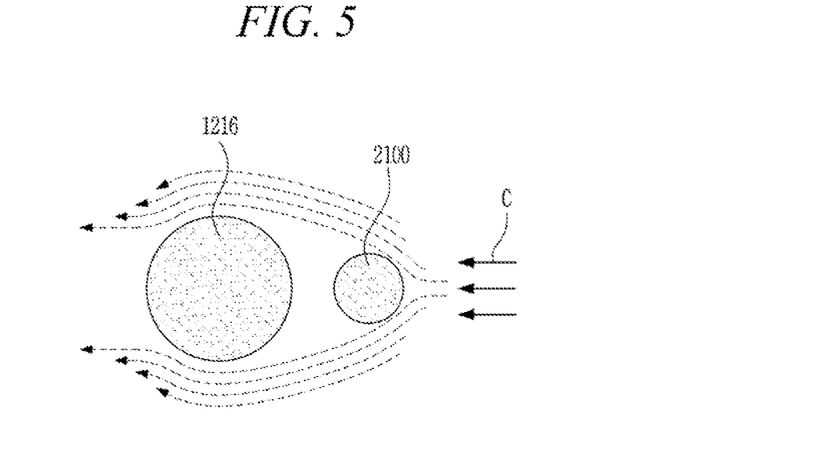
FIG. 5 is a plan view of a portion of FIG. 4, which illustrates the flow of compressed air in the flow passage.

FIG. 4 is a partial side-sectional view illustrating a portion of a combustor according to an embodiment of the system, and FIG. 5 is a plan view of a portion of FIG. 4, which illustrates the flow of compressed air in the flow passage.

Referring to FIG. 4, the combustor according to an embodiment of the system includes a sleeve 1211, a combustion liner 1212, a cooling hole 1216, and a first auxiliary hole 2100.

A combustion chamber 1210 is an energy-generating element, which drives a turbine by combusting a mixture, in which fuel and compressed air are premixed, and by converting high-temperature gas into kinetic energy. The sleeve 1211 surrounds the combustion liner 1212 and the transition piece 1217 while being spaced apart therefrom. A flow passage 1215, through which compressed air introduced thereinto through the cooling hole 1216 flows along the combustion liner 1212 and the transition piece 1217, is formed between the combustion liner 1212 and the sleeve 1211 and between the transition piece 1217 and the sleeve 1211. The cooling hole 1216 may be formed in a portion of the sleeve that surrounds the combustion liner 1212, and may also be formed in a portion of the sleeve that surrounds the transition piece 1217.

The first auxiliary hole 2100 is formed upstream of the cooling hole 1210 on the basis of the airflow direction. Here, the upstream side of the cooling hole refers to a region in which compressed air introduced into the flow passage 1215 through the first auxiliary hole 2100 impinges with a cross-flow earlier than compressed air introduced into the flow passage 1215 through the cooling hole 1216.

As illustrated in FIG. 5, the cross-flow C flowing through the flow passage 1215 primarily impinges with the compressed air introduced into the flow passage 1215 through the first auxiliary hole 2100, and thus the cross-flow is diverted from the impingement point so as to avoid impinging with the compressed air introduced into the flow passage 1215 through the cooling hole 1216. In other words, the compressed air introduced into the flow passage 1215 through the first auxiliary hole 2100 serves as an air column, which prevents the compressed air introduced into the flow passage 1215 through the cooling hole 1216 from being affected by the cross-flow.

Since the compressed air introduced through the cooling hole 1216 (the jet flow) is affected less by the cross-flow due to the air-column effect exhibited by the compressed air introduced through the first auxiliary hole 2100, the jet flow impinges with the surfaces of the combustion liner 1212 and the transition piece 121 in a direction substantially perpendicular thereto. Needless to say, because it is difficult to completely exclude the influence of the cross-flow, the jet flow may perform impingement in the diagonal direction to a certain extent. However, the impingement angle is closer to a right angle than that in the prior art. Therefore, impingement cooling efficiency may be improved, and the surface temperature of the combustion liner 1212 and the transition piece 1217 may be maintained relatively low. As a result, it is possible to prevent deterioration in the strength of the combustion liner 1212 and the transition piece 1217.

Hereinafter, the above-described combustor according to an embodiment of the system will be described in more detail. When the diameter of the cooling hole 1216 is D, it is desirable that the diameter of the first auxiliary hole 2100 be set to 0.5 D or less. If the diameter of the first auxiliary hole 2100 exceeds 0.5 D, the function of the first auxiliary hole 2100 is not actually discriminated from the function of the cooling hole 1216. That is, this may be equivalent to the configuration in which another cooling hole is added, and such a configuration poses a problem in that the overall momentum of the jet flow is weakened, and thus cooling efficiency is deteriorated.

In addition, it is desirable that the cooling hole 1216 and the first auxiliary hole 2100 be spaced apart from each other such that the straight-line distance therebetween is set to a value that is equal to or less than the diameter D of the cooling hole. If the straight-line distance between the cooling hole 1216 and the first auxiliary hole 2100 exceeds the value of the diameter D of the cooling hole, the air-column effect exhibited by the compressed air introduced through the first auxiliary hole 2100 may be degraded, and thus the cross-flow may have an influence on the jet flow.

Figure 6:
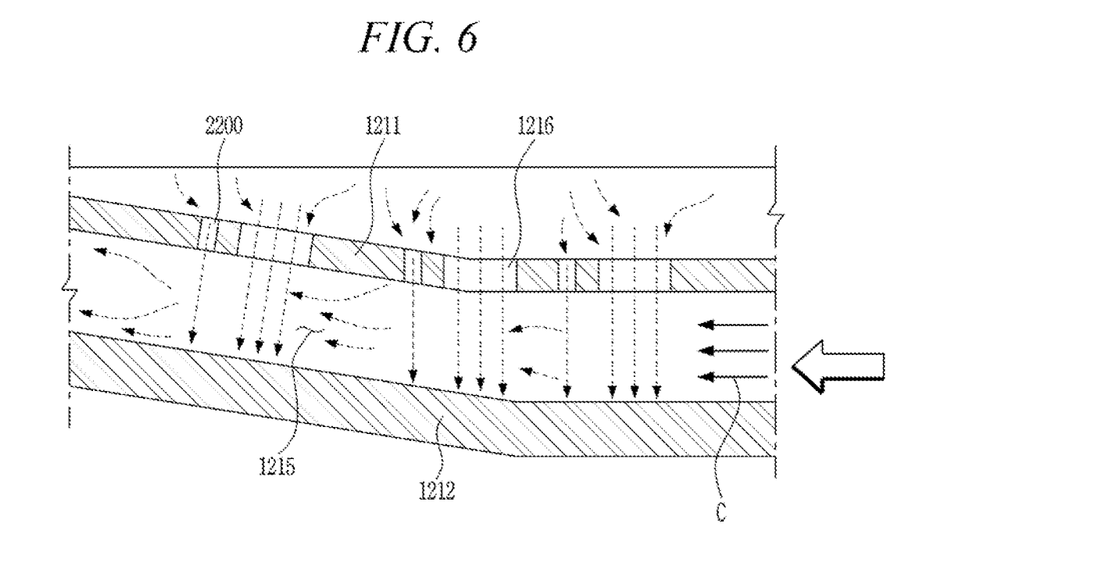
FIG. 6 is a partial side-sectional view illustrating a portion of a combustor according to an embodiment of the system.
Figure 7:
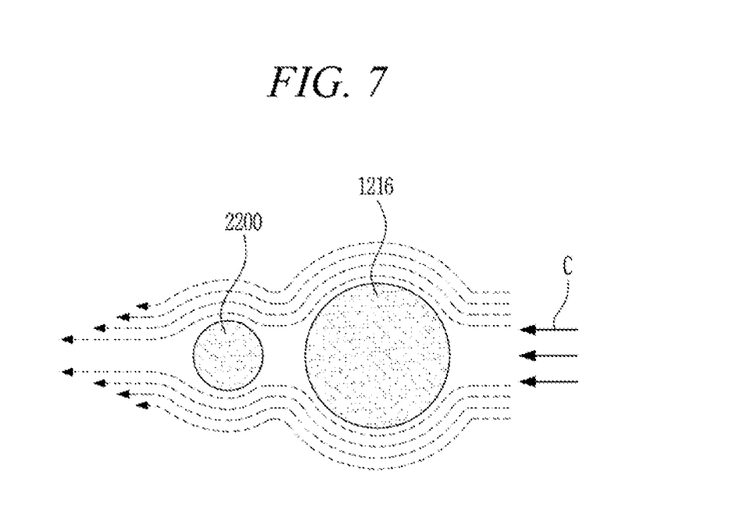
FIG. 7 is a plan view of a portion of FIG. 6, which illustrates the flow of compressed air in the flow passage.

FIG. 6 is a partial side-sectional view illustrating a portion of a combustor according to an embodiment of the system, and FIG. 7 is a plan view of a portion of FIG. 6, which illustrates the flow of compressed air in a flow passage.

The combustor according to FIG. 6 of the system includes a second auxiliary hole 2200, which is formed downstream of the cooling hole 1216 in airflow direction, instead of the first auxiliary hole 2100 formed upstream of the cooling hole 1216 in the combustor. However, the other components, such as a sleeve 1211, a combustion liner 1212, a flow passage 1215, a cooling hole 1216, and a transition piece 1217, of the combustor according to an embodiment are substantially the same as those of the combustor described above, and therefore a duplicate explanation thereof will be omitted.

The second auxiliary hole 2200 is formed downstream of the cooling hole 1216 on the basis of the airflow direction. Here, the downstream side of the cooling hole refers to a region in which the compressed air introduced into the flow passage 1215 through the cooling hole 1216 primarily impinges with the cross-flow and the compressed air introduced into the flow passage 1215 through the second auxiliary hole 2200 secondarily impinges with the cross-flow.

As illustrated in FIG. 7, the cross-flow flowing through the flow passage 1215 primarily impinges with the compressed air introduced through the cooling hole 1216, and becomes turbulent due to the air column formed by jet flow. Subsequently, the turbulence generated in this way is mitigated by the compressed sir introduced through the second auxiliary hole 2200, which serves to maintain the momentum of the compressed air introduced through the cooling hole 1216.

Therefore, impingement cooling efficiency may be improved, and the surface temperature of the combustion liner 1212 and the transition piece 1217 may be maintained relatively low. As a result, it is possible to prevent deterioration in the strength of the combustion liner 1212 and the transition piece 1217.

Figure 8:
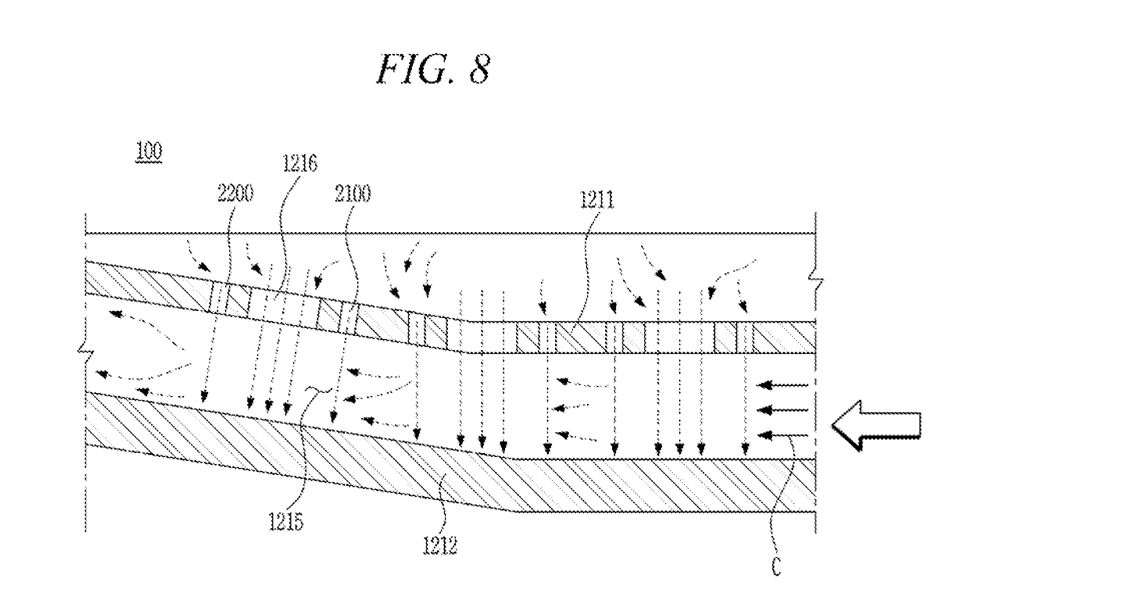
FIG. 8 is a partial side-sectional view illustrating a portion of a combustor according to an embodiment of the system.

The diameter of the second auxiliary hole 2200 and the straight-line distance between the cooling hole 1216 and the second auxiliary hole 2200 may be set to predetermined values in the same way as in the above-described embodiment. FIG. 8 is a partial side-sectional view illustrating a portion 100 of a combustor according to an embodiment of the system, and FIG. 9 is a plan view of a portion of FIG. 8, which illustrates the flow of compressed air in a flow passage.

The combustor according to an embodiment of the system is a combination of the above-described combustors. A first auxiliary hole 2100 is formed upstream of a cooling hole 1216, and a second auxiliary hole 2200 is formed downstream of the cooling hole 1216.

The diameter of the first auxiliary hole 2100, the straight-line distance between the cooling hole 1216 and the first auxiliary hole 2100, the diameter of the second auxiliary hole 2200 and the straight-line distance between the cooling hole 1216 and the second auxiliary here 2200 say be set to predetermined values in the same way as in the above-described system.

Figure 9:
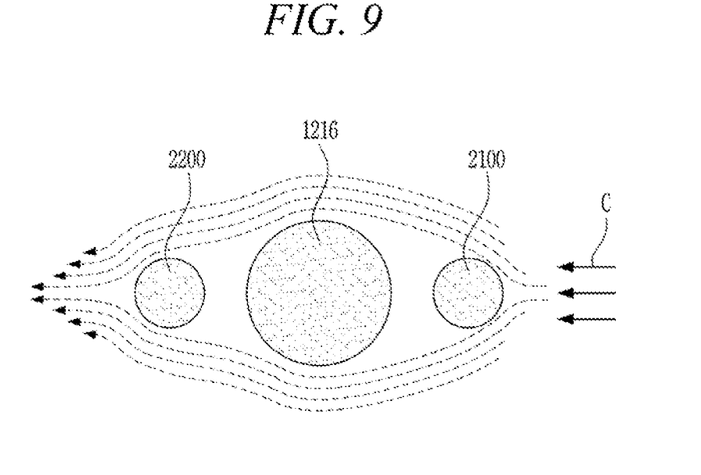
FIG. 9 is a plan view of a portion of FIG. 8, which illustrates the flow of compressed air in the flow passage.

As illustrated in FIG. 9, according to the combustor of an embodiment, the compressed air introduced through the first auxiliary hole 2100 impinges with the cross flow column, by which the cross-flow is diverted from the impingement point, and the turbulence, which is generated by impingement between the compressed air introduced through the first auxiliary hole 2100 or the cooling hole 1216 and the cross-flow, is mitigated by the compressed air introduced through the second auxiliary hole 2200, thereby maintaining the momentum of the introduced compressed air.

Therefore, impingement cooling may be more efficiently applied to the combustion liner 1212 and the transition piece 1217, and the surface temperature of the combustion liner 1212 and the transition piece 1217 may be maintained relatively low. As a result, it is possible to prevent deterioration in the strength of the combustion liner 1212 and the transition piece 1217.

Figure 10A:
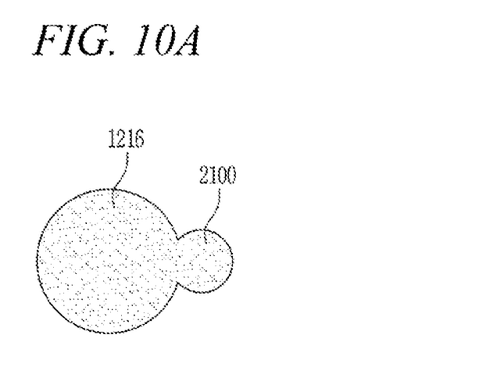
FIG. 10A to 10C are plan views illustrating various examples of an embodiment of the system of FIG. 8.
Figure 10B:
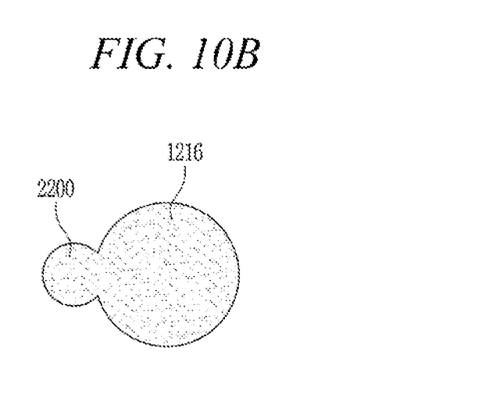
Figure 10C:
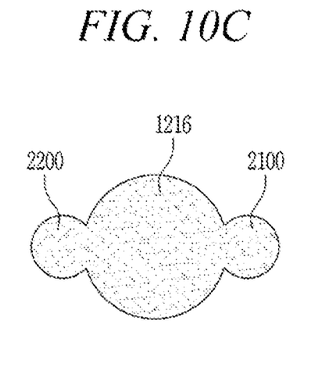

FIG. 10A to 10C are plan views illustrating various examples of combustors according to embodiments of the system.

As illustrated in FIG. 10A to 10C, the combustors according to embodiments of the system are not limited to a configuration in which the cooling hole 1216 and the first auxiliary hole 2100 are spaced apart from each other or in which the cooling hole 1216 and the second auxiliary hole 2200 are spaced apart from each other, and may be configured such that at least a portion of the first auxiliary hole 2100 and/or the second auxiliary hole 2200 overlaps the cooling hole 1216.

In the case in which a portion of the first auxiliary hole 2100 and/or the second auxiliary hole 2200 overlaps the cooling hole 1216, like the above-described embodiments, the air-column effect exhibited by the first auxiliary hole 2100 or the air-column momentum maintenance effect exhibited by the second auxiliary hole 2200 may be obtained, thereby further improving impingement cooling efficiency compared to the prior art.

As is apparent from the above description, according to an embodiment of the system, since the jet flow is affected less by the cross-flow due to the air-column effect exhibited by the compressed air introduced through the first auxiliary hole, the jet flow impinges with the surfaces of the combustion liner and the transition piece in the direction substantially perpendicular thereto. As a result, impingement cooling efficiency is improved.

In addition, since the turbulence generated by impingement between the cross-flow and the jet flow is mitigated and the momentum of the jet flow is maintained by the compressed air introduced through the second auxiliary hole, it is possible to improve impingement cooling efficiency.

Although the embodiments of the system have been disclosed for illustrative purposes, those skilled in the art will appreciate that various modifications, additions and substitutions are possible, without departing from the scope and spirit of the system as disclosed in the accompanying claims.

What is claimed is:

1. A combustor comprising:
a combustion liner constituting a combustion chamber;
a transition piece constituting the combustion chamber and having a combustion gas flowing therethrough in a combustion gas flow direction and the transition piece disposed on a downstream side of the combustion liner with respect to the combustion gas flow direction;
a sleeve surrounding the combustion liner and the transition piece while being spaced apart therefrom;
a flow passage formed between the combustion liner and the sleeve and between the transition piece and the sleeve and having a cross-flow of compressed air discharged from a compressor into the flow passage;
a plurality of cooling holes having a first diameter D formed in the sleeve to introduce a first flow of compressed air discharged from each of the plurality of cooling holes from the compressor into the flow passage;
a plurality of auxiliary holes, each of the plurality of auxiliary holes having a second diameter of 0.5D or less wherein each of the plurality of auxiliary holes is formed in the sleeve and each auxiliary hole is separated from adjacent auxiliary holes by one of the plurality of cooling holes in a direction of the cross-flow in the flow passage, and
wherein a second flow of compressed air discharged from the compressor is introduced into the flow passage through each of the plurality of auxiliary holes, impinges with the cross-flow of compressed air discharged from the compressor flowing through the flow passage at each of a plurality of impingement points, and diverts the cross-flow from the first air flow to avoid impinging with the first flow of compressed air of the plurality of cooling holes, such that the first flow of compressed air forms an air column that is closer to perpendicular to a surface of the sleeve than without the second flow of compressed air.

2. The combustor according to claim 1, wherein each of the plurality of cooling holes and each of the plurality of auxiliary holes are spaced apart from each other such that a straight-line distance therebetween has a value that is equal to or less than the diameter (D) of the cooling hole.

3. A combustor comprising: a combustion liner constituting a combustion;
a transition piece constituting the combustion chamber and having a combustion gas flowing therethrough in a combustion gas flow direction and the transition piece disposed on a downstream side of the combustion liner with respect to the combustion gas flow direction;
a sleeve surrounding the combustion liner and the transition piece while being spaced apart therefrom; a flow passage formed between the combustion liner and the sleeve and between the transition piece and the sleeve and having a cross-flow of compressed air discharged from a compressor into the flow passage;
a plurality of cooling holes having a first diameter D formed in the sleeve to introduce a first flow of compressed air discharged from each of the plurality of cooling holes from the compressor into the flow passage;
a plurality of auxiliary holes, each of the plurality of auxiliary holes having a second diameter of 0.5D or less wherein each of the plurality of auxiliary holes are formed in the sleeve and each auxiliary hole is separated from adjacent auxiliary holes by one of the plurality of cooling holes in a direction of the cross-flow in the flow passage, and
wherein a second flow of compressed air discharged from the compressor is introduced into the flow passage through each of the plurality of auxiliary holes, diverts the cross-flow from the first air flow to avoid impinging with the first flow of compressed air at each of the plurality of cooling holes, and mitigates turbulence generated downstream of the cooling holes, and maintains momentum of the first flow of compressed air discharged from the compressor introduced through the cooling holes, such that the first flow of compressed air forms an air column that is closer to perpendicular to a surface of the sleeve than without the second flow of compressed air.

4. The combustor according to claim 3, each of the plurality of cooling holes and each of the plurality of auxiliary holes are spaced apart from each other such that a straight-line distance therebetween has a value that is equal to or less than the diameter (D) of the cooling hole.

5. A gas turbine comprising:
a compressor configured to compress air;
a combustor configured to receive the compressed air from the compressor, to form a mixture by mixing the compressed air with fuel, and to combust the mixture; and
a turbine configured to be rotated by combustion gas discharged from the combustor to produce power, wherein the combustor comprises:
a combustion liner constituting a combustion chamber;
a transition piece constituting the combustion chamber and having a combustion gas flowing therethrough in a combustion gas flow direction and the transition piece disposed on a downstream side of the combustion liner with respect to the combustion gas flow direction;
a sleeve surrounding the combustion liner and the transition piece while being spaced apart therefrom;

a flow passage formed between the combustion liner and the sleeve and between the transition piece and the sleeve and having a cross-flow of compressed air discharged from a the compressor into the flow passage;

a plurality of cooling holes having a first diameter (D) formed in the sleeve to introduce a first flow of compressed air discharged from each of the plurality of cooling holes from the compressor into the flow passage; and a plurality of auxiliary holes, each of the plurality of auxiliary holes having a second diameter of 0.5D or less wherein each of the plurality of auxiliary holes are formed in the sleeve and each auxiliary hole is separated from adjacent auxiliary holes by one of the plurality of cooling holes in a direction of the cross-flow in the flow passage, and wherein a second flow of compressed air discharged from the compressor is introduced into the flow passage through each of the plurality of auxiliary holes, impinges with the cross-flow of compressed air discharged from the compressor flowing through the flow passage to avoid the cross-flow of compressed air impinging with the first flow of compressed air at each of the plurality of cooling holes, such that the first flow of compressed air forms an air column that is closer to perpendicular to a surface of the sleeve than without the second flow of compressed air.

6. The gas turbine according to claim 5, wherein each of the plurality of cooling holes and each of the plurality of auxiliary holes are spaced apart from each other such that a straight-line distance therebetween has a value that is equal to or less than the diameter (D) of the cooling hole.

7. A method of distributing compressed air in a combustor configured to receive compressed air from a compressor, to form a mixture by mixing the compressed air with fuel, and to combust the mixture, the combustor comprising:
a combustion liner constituting a combustion chamber;
a transition piece constituting the combustion chamber and having a combustion gas flowing therethrough in a combustion gas flow direction and the transition piece disposed on a downstream side of the combustion liner with respect to the combustion gas flow direction;
a sleeve surrounding the combustion liner and the transition piece while being spaced apart therefrom;
a flow passage formed between the combustion liner and the sleeve and between the transition piece and the sleeve and having a cross-flow of compressed air discharged from a compressor into the flow passage;
a plurality of cooling holes having a first diameter D formed in the sleeve to introduce a first flow of compressed air discharged from each of the plurality of cooling holes from the compressor into the flow passage;
a plurality of auxiliary holes, each of the plurality of auxiliary holes having a second diameter of 0.5D or less wherein each of the plurality of auxiliary holes is formed in the sleeve and each auxiliary hole is separated from adjacent auxiliary holes by one of the plurality of cooling holes in a direction of the cross-flow in the flow passage, the method comprising:
forming the cross-flow by allowing the first flow of compressed air to be introduced into the flow passage through the plurality of cooling holes and to flow through the flow passage; and
forming an air column by allowing a second flow of compressed air introduced into the flow passage through the auxiliary holes formed upstream of the cooling holes in the direction of the cross-flow in the flow passage, to impinge with the cross-flow.

8. The method according to claim 7, further comprising: mitigating turbulence generated downstream of the cooling hole in the airflow direction and maintaining momentum of the first flow of compressed air introduced through the plurality of cooling holes by allowing the second flow of compressed air to be introduced into the flow passage through the auxiliary holes formed downstream of the cooling hole in the direction of the cross-flow in the flow passage.

9. A method of distributing compressed air in a combustor configured to receive compressed air from a compressor, to form a mixture by mixing the compressed air with fuel, and to combust the mixture, the combustor comprising:
a combustion liner constituting a combustion chamber;
a transition piece constituting the combustion chamber and having a combustion gas flowing therethrough in a combustion gas flow direction and the transition piece disposed on a downstream side of the combustion liner with respect to the combustion gas flow direction;
a sleeve surrounding the combustion liner and the transition piece while being spaced apart therefrom;
a flow passage formed between the combustion liner and the sleeve and between the transition piece and the sleeve and having a cross-flow of compressed air discharged from a compressor into the flow passage;
a plurality of cooling holes having a first diameter D formed in the sleeve to introduce a first flow of compressed air discharged from each of the plurality of cooling holes from the compressor into the flow passage;
a plurality of auxiliary holes, each of the plurality of auxiliary holes having a second diameter of 0.5D or less wherein each of the plurality of auxiliary holes is formed in the sleeve and each auxiliary hole is separated from adjacent auxiliary holes by one of the plurality of cooling holes in a direction of the cross-flow in the flow passage, the method comprising:
forming the cross-flow by allowing the first flow of compressed air to be introduced into the flow passage through the plurality of cooling holes and to flow through the flow passage; and
mitigating turbulence generated downstream of the plurality of cooling holes in the direction of the cross-flow in the passage and maintaining momentum of the first flow of compressed air introduced through the the plurality of cooling holes by allowing a second flow of compressed air to be introduced into the flow passage through the auxiliary holes formed downstream of the plurality of cooling holes in the direction of the cross-flow in the flow passage.

* * * * *